United States Patent
Agarwal et al.

(10) Patent No.: US 12,455,862 B1
(45) Date of Patent: Oct. 28, 2025

(54) MANAGED SERVICE FOR DATABASE MIGRATION

(71) Applicant: Amazon Technologies, Inc., Seattle, WA (US)

(72) Inventors: Prashant Agarwal, Faridabad (IN); Roman Yelysieiev, Gdansk (PL); Vladislavs Tomasevs, Seattle, WA (US); Justin Qoun Tang, New York, NY (US); Qi Cui, Toronto (CA); Mehdi Naseri, Toronto (CA); Krit Gupta, Vancouver (CA); Harpreet Kaur Chawla, Fremont, CA (US); Igor Bekelman, Redmond, WA (US); Mykyta Sokolov, North Bend, WA (US); Denys Seliukov, Gdansk (PL)

(73) Assignee: Amazon Technologies, Inc., Seattle, WA (US)

(*) Notice: Subject to any disclaimer, the term of this patent is extended or adjusted under 35 U.S.C. 154(b) by 68 days.

(21) Appl. No.: 18/194,577

(22) Filed: Mar. 31, 2023

(51) Int. Cl.
*G06F 16/21* (2019.01)

(52) U.S. Cl.
CPC .................. *G06F 16/214* (2019.01)

(58) Field of Classification Search
CPC ...................................... G06F 16/214
See application file for complete search history.

(56) References Cited

U.S. PATENT DOCUMENTS

| | | | |
|---|---|---|---|
| 7,664,795 B2 * | 2/2010 | Balin | G06F 16/214 717/172 |
| 9,430,505 B2 | 8/2016 | Padmanabhan et al. | |
| 10,579,403 B2 | 3/2020 | Antony et al. | |
| 2008/0243864 A1 * | 10/2008 | McGauley | G06F 16/27 |
| 2014/0366155 A1 * | 12/2014 | Chang | G06F 9/45558 726/27 |
| 2016/0321274 A1 * | 11/2016 | Narayan | G06F 16/162 |
| 2020/0311095 A1 * | 10/2020 | Gorshtein | G06F 16/2358 |
| 2021/0081379 A1 * | 3/2021 | Buehne | G06F 16/214 |
| 2022/0138166 A1 * | 5/2022 | Buehne | G06F 16/275 707/634 |
| 2022/0345524 A1 | 10/2022 | Mitkar et al. | |

* cited by examiner

*Primary Examiner* — Jared M Bibbee
(74) *Attorney, Agent, or Firm* — S. Scott Foster; Kowert, Hood, Munyon, Rankin & Goetzel, P.C.

(57) ABSTRACT

A client of a database service may request a migration of a remote source database to a target database provided by the database service, where the source database and target database are published by a database vendor. Responsive to the request, a migration tool published by the database vendor may be selected from among multiple migration tools. The migration tool may derive a schema from the source database and create the target database according to the derive schema. The migration tool may then extract data of the source database using native application programming interfaces (APIs) provided by the vendor. The extracted data may then be imported into the target database using one or more additional native APIs. The migration tool may then initiate replication of transactions performed at the source database to the target database.

18 Claims, 8 Drawing Sheets

MANAGED SERVICE FOR DATABASE MIGRATION

BACKGROUND

Clients of database services frequently have a need to migrate self-managed or remotely-managed databases into databases provided by the database service, with the target databases often being published by the same database vendor as the source database. While operating target databases may be straightforward, the migration process itself may be time consuming and error prone and may entail technical challenges to business operation. Furthermore, while source databases may have public schemas that allow for discovery of publicly accessible features, complete migration of a source database may be achievable only using migration tools published by the same database vendor.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Clients of database services frequently have a need to migrate self-managed or remotely-managed databases into databases provided by the database service, with the source and target databases often being published by the same or compatible database vendor. While operating target databases may be straightforward, the migration process itself may be time consuming and error prone and may entail technical challenges to business operation. Furthermore, while source databases may have public schemas that allow for discovery of publicly accessible features, complete migration of a source database may be achievable only using migration tools published by the same database vendor using vendor-specific techniques and interfaces.

Systems and methods for performing like-to-like migrations of database are disclosed. A client of a database service may request a migration of an unmanaged or client-managed source database to a target database provided by and managed by the database service, where the source database and target database are compatible with a vendor-specific migration tool published to support and simplify the migration of databases. Examples of source and target database compatibility may include like or matching database publishers or vendors, schema or database type compatibility, database engine versions, and so forth. Responsive to the request, this vendor-specific or custom migration tool published by a database vendor may be selected from among multiple migration tools including both vendor-specific and vendor-agnostic tools. The migration tool may derive a schema from the source database and create or update the target database according to the derived schema. The migration tool may then extract data of the source database using native or vendor-specific application programming interfaces (APIs) provided by the vendor. The extracted data may then be imported into the target database using one or more additional native APIs. The migration tool may then initiate replication of changes performed at the source database to the target database. Data migration may further implement a mixture of vendor-specific and vendor-agnostic tools in the migration of databases. Through the use of both vendor-specific and vendor-agnostic tools based on publishers of source and target databases, database migrations which may otherwise be time consuming and error prone may be greatly automated and simplified.

Figure 1:
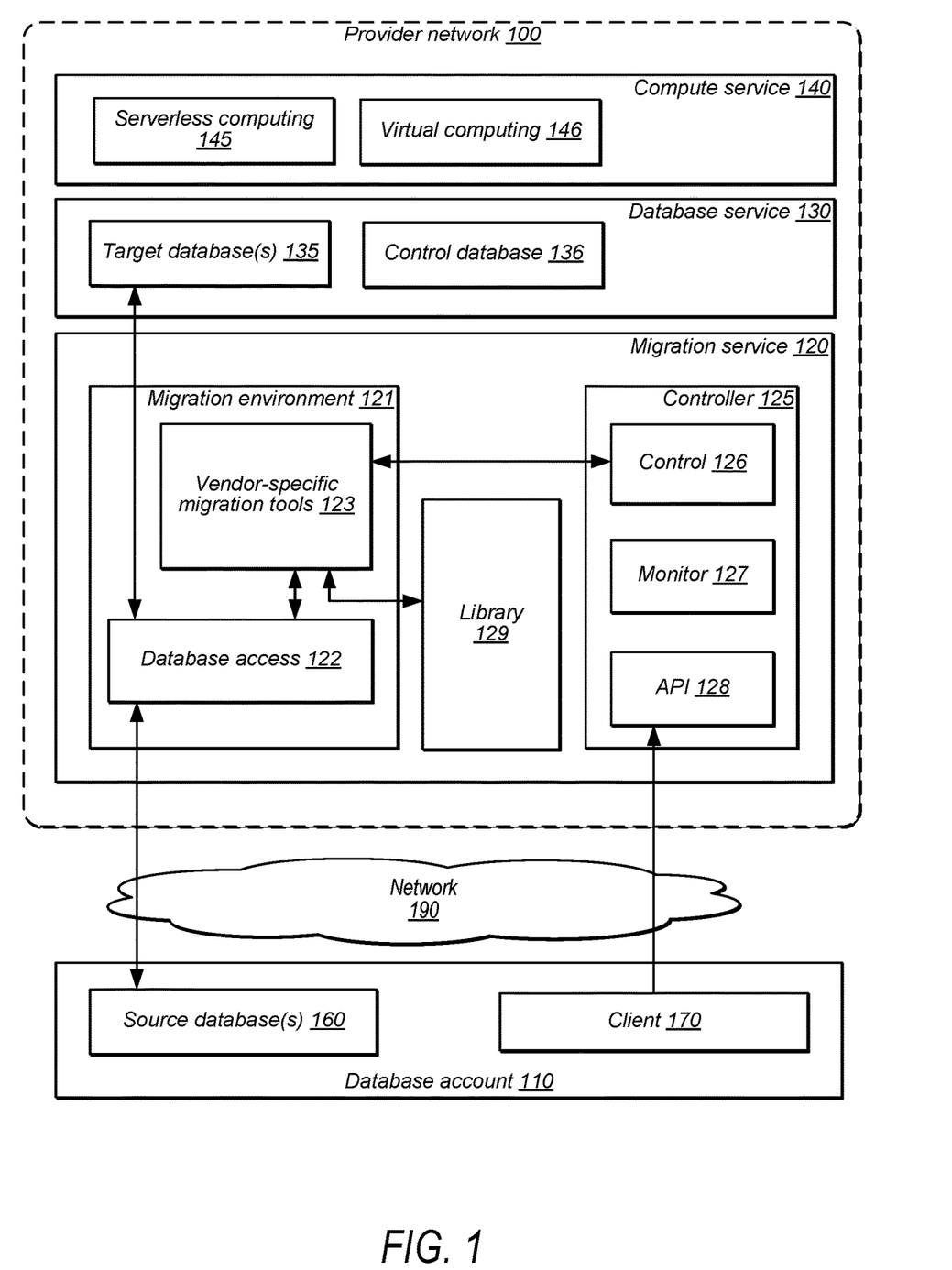
FIG. 1 is a block diagram of an architecture for a system that implements a migration service for migrating databases, according to at least some embodiments.

FIG. 1 is a block diagram of an architecture for a system that implements a migration service for migrating databases, according to at least some embodiments. Through the selective use of vendor-specific and vendor-agnostic tools, a migration service may automate and simplify database migrations which may otherwise be time consuming and error prone, in some embodiments. A provider network 100, such as shown in further detail below in FIG. 7, may provide a compute service 140, database service 130 and a migration service 120 to client(s) 170 over a network 190. A client 170 may access these services via a database account 110 and may provide access to one or more source databases 160 associated with the database account 110 via the network 190. In some embodiments the source database(s) 160 may be external to the database service 130 while in other embodiments the source database(s) 160 may be provided by the database service 130 or otherwise provided within the provider network 100. This source database(s) 160 may be external to the database service 130 and/or the provider network 100 in some embodiments.

The migration services 120 may include a controller 125 that coordinates migrations of databases and controls migration environments, progress and status. The controller 125 may include an application programming interface (API) 128, a monitor 127 and a control module 126. The API 128 may receive and validate client requests and execute fast operations using the control module 126 such as describe, create, modify, stop and delete of native migrations. For longer operations may further use the monitor 127 in addition to the control module 126.

In some embodiments, portions of the controller 125, including portions of the monitor 127 and control module 126, may be implemented using serverless computing 145 of the compute service 140 and may store various information regarding migrations in a control database 136.

To implement a database migration in response to a request from a client 170 received through the API 128, the controller 125 may create a migration environment 121. This virtual environment may be created using the compute service 140 and may utilize serverless computing 145 or virtual computing 146, in various embodiments. The client virtual environment may include a database access component 122 and one or more vendor-specific migration tools 123. In some embodiments, the vendor-specific migration tools May incorporation standard, generic, or vendor-agnostic migration functions that may be performed independent on any particular vendor-specific features of the source and target databases. These standard migration functions may be incorporated directly into the vendor-specific tools in some embodiments or incorporated from a library 129 of generic migration functions provided by the migration service 120. The vendor-specific migration tools are discussed in further detail below in FIGS. 2 and 3. To create the migration environment 121 with the proper migration tools, the controller 125 may identify a supplier or vendor of a particular source database 160 and select the vendor-specific migration tools from among a collection of migration tools for different database vendors.

Once the migration environment 121 has been created with the appropriate vendor-specific migration tools 123, the controller 125 may determine a schema for the source database(s) 160 by accessing the source database(s) via the database access component 122 using the vendor-specific migration tools 123. The schema may include publicly visible schema elements as well as private schema elements identifiable via vendor-specific techniques, in some embodiments.

This determined schema may then be used to create one or more target databases 135 in the database service, where the target databases are provided by the same vendor that supplies the source database(s) 160 and the vendor-specific migration tools 123. The controller 125 may then perform various migration operations to export the source database(s) and import data into the target database(s) using vendor-native migration capabilities provided in the vendor-specific migration tools 123.

Figure 2:
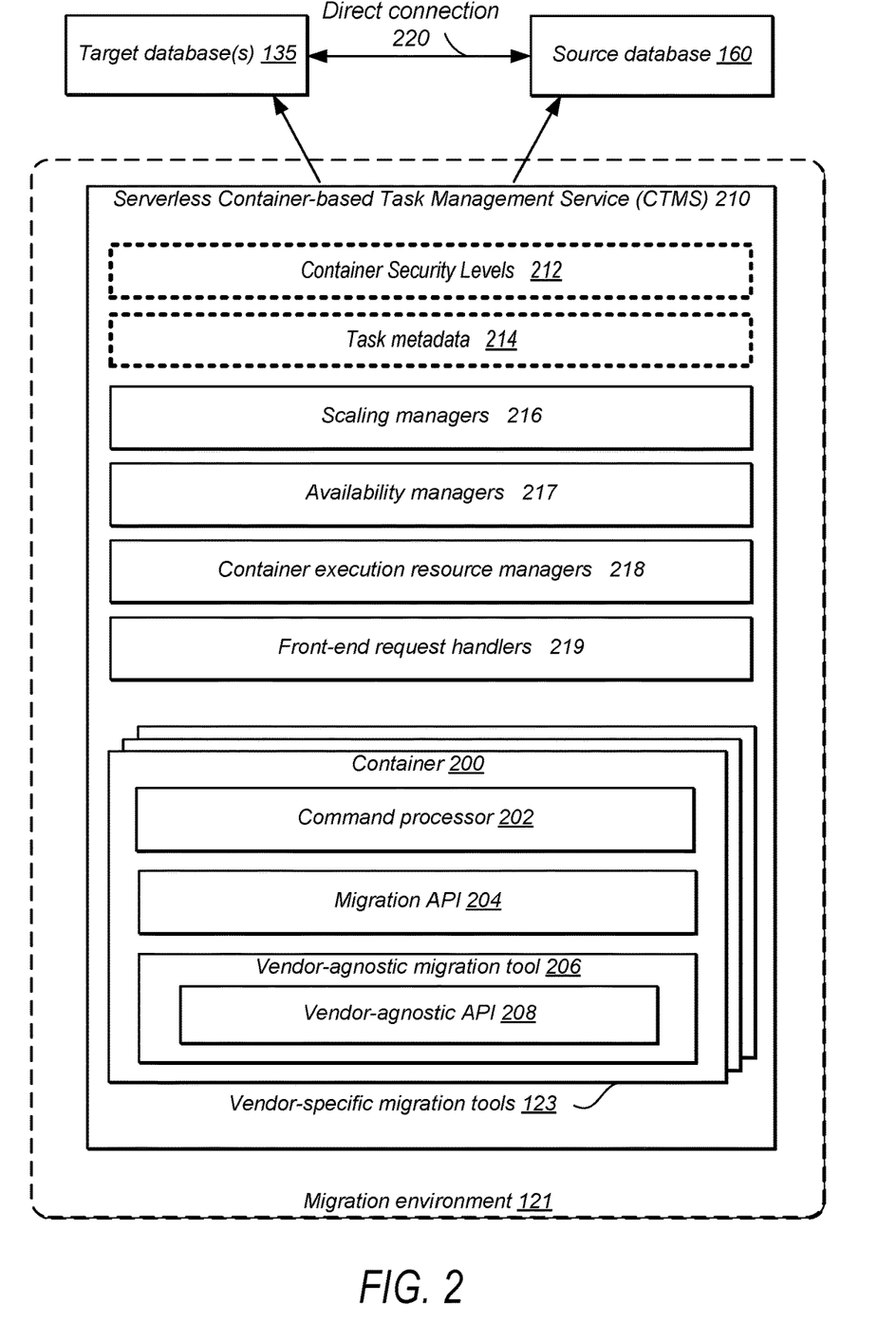
FIG. 2 is a block diagram of an architecture for a migration tool container that implements vendor-specific migration of databases, according to at least some embodiments.

FIG. 2 is a block diagram of an architecture for a migration tool container that implements vendor-specific migration of databases through execution by a serverless compute service, according to at least some embodiments. A migration tool container may be usable to enable migration to be performed using a serverless compute service, improving availability, scalability and ease of use in implementing database migrations, in some embodiments. Vendor-specific migration tools 123 may be implemented using application container(s) 200, in some embodiments. These containers may individually implement a migration service complying with a public migration application programming interface (API) 204 and may contain a command processor 202 implementing the migration API and a vendor-agnostic migration tool 206 developed and optimized for databases published by a particular database vendor. The vendor-agnostic migration tool 206 may provide a vendor-agnostic API 208 which may be utilized by the command processor 202 to implement the migration API 204 for databases published by a particular database vendor, in some embodiments. Details of the container 200 are discussed further below in FIG. 3.

For database migrations involving source and target databases published by a same database vendor, a container including a migration tool published by the database vendor may be selected from among multiple migration tool containers. The selected container may be provided to a compute service, such as the compute service 140 of FIG. 1, that may then execute migration commands to implement a database migration for databases published by the database vendor, in some embodiments. Execution of migration operations may be performed by a virtual machine instance of the compute service, for example using virtual computing 146 as shown in FIG. 1, or may be performed using a serverless container-based task management service (CTMS) 210, such as is shown in serverless computing 145 of FIG. 1. A migration operation executing on a CTMS 210 or other virtual machine instance may then access source database(s) 160 and target database(s) 135, or direct data import and export operations between the source database(s) 160 and target database(s) 135 via a direct communications connection 220.

The CTMS 210 (referred to in various implementations as an elastic container instance service, container instance service, or cloud run service) may include several subcomponents in the depicted embodiments, including front-end request handlers 219, container execution resource managers 218, availability managers 217, and scaling managers 216, each of which may be implemented using software and/or hardware of one or more computing devices. The CTMS 210 may store a set of task metadata 214, indicating for example the constituent software containers of tasks to be run on behalf of CTMS clients.

A given task, whose definition or descriptor may be submitted by a CTMS client, may comprise one or more software containers. Within a task, individual software containers may be run at respective security levels of a plurality of supported container security levels 212 in the depicted embodiment, such as a standard security level and an enhanced security level. The enhanced security level may be referred to as an "enclave" security level in some embodiments, and the containers run at such levels may be referred to as enclave containers or trusted containers. In some embodiments, more than two container security levels may be supported at a CTMS—e.g., clients may be enabled to select from standard security, medium enhanced security, and high enhanced security levels for their containers.

The front-end request handlers 219 may receive client-submitted programmatic requests, pass on corresponding internal messages to other components of the CTMS 210 in the depicted embodiment to perform the requested operations, validate and store the metadata indicated in the requests and so on. Container execution resource managers 218 may be responsible for identifying (e.g., selecting, provisioning, activating and/or launching) at least an initial set resources to be used to run various container instances of a task on behalf of CTMS clients. Availability managers 217 may be responsible for monitoring the health (e.g., responsiveness) of various containers set up by the container execution resource managers 218, and for responding to failures or errors detected at containers—e.g., by causing a replacement container to be set up in the event of a failure. Scaling managers 216 may be responsible for monitoring performance metrics associated with tasks and their constituent containers, and (if needed, based on the clients' preferences) implementing dynamic scaling of serverless computing resources of a compute service by instantiating additional containers to handle increasing workloads in some embodiments.

In some embodiments, descriptor or definitions of tasks may be registered in response to programmatic requests received at the CTMS. A given task descriptor may for example indicate the set of constituent containers of a task, the targeted security levels at which the tasks are to be run (selected from among supported container security levels 212), the computing and memory resources needed for each of the constituent containers, the machine images to be used for each of the containers, and so on. In at least some embodiments, the container images may be stored at a storage service (not shown) or a control database, such as the control database 136 as shown in FIG. 1, of the provider network, and a client may indicate the identifiers to be used to access the images from the storage service in the task descriptors. Records representing the task descriptors may be stored as task metadata 214 by the CTMS. In at least some embodiments, CTMS clients may separately request registration of containers, by providing container descriptors, and then refer to the pre-registered containers when providing task descriptors.

After registering tasks and/or task containers, a CTMS client may submit a separate request to run an instance of a specified task in some embodiments. In other embodiments, separate registration and run requests may not be needed—e.g., a client may use a single request to define a task and its constituent containers, and also request that one or more instances of the task be run.

In at least some embodiments, the container execution resource managers 218 may utilize resources of virtualized computing service (VCS) to run tasks' container instances. The VCS may include a plurality of virtualization hosts (VHs) with each VH comprising a set of virtualization management components (VMCs) and zero or more guest virtual machines (GVMs) 124 such as GVMs. GVMs may also be referred to as compute instances. VMCs may comprise, for example, a hypervisor and/or an administrative virtual machine in various embodiments which collectively act as intermediaries between the GVMs and at least some hardware components of the VHs. In some embodiments, at least some VMC functionality (e.g., functionality associated with networking virtualization) may be performed using a set of offload cards connected via a peripheral interconnect (such as Peripheral Component Interconnect-Express (PCIe)) to the primary processors of the VH, thereby freeing up more of the computing resources of the VH for GVMs. GVMs may also be referred to as compute instances in various embodiments.

A VCS may support several different categories or classes of GVMs in the depicted embodiment. The categories may differ from one another along one or more dimensions, such as computing capacity, memory capacity, storage capacity, the number and types of emulated devices supported by the VMCs for the GVMs, the number of system calls supported by the operating system kernels of the GVMs, the capabilities (e.g., number of APIs) supported by middleware components such as container runtimes included in the GVMs, and so on.

Figure 7:
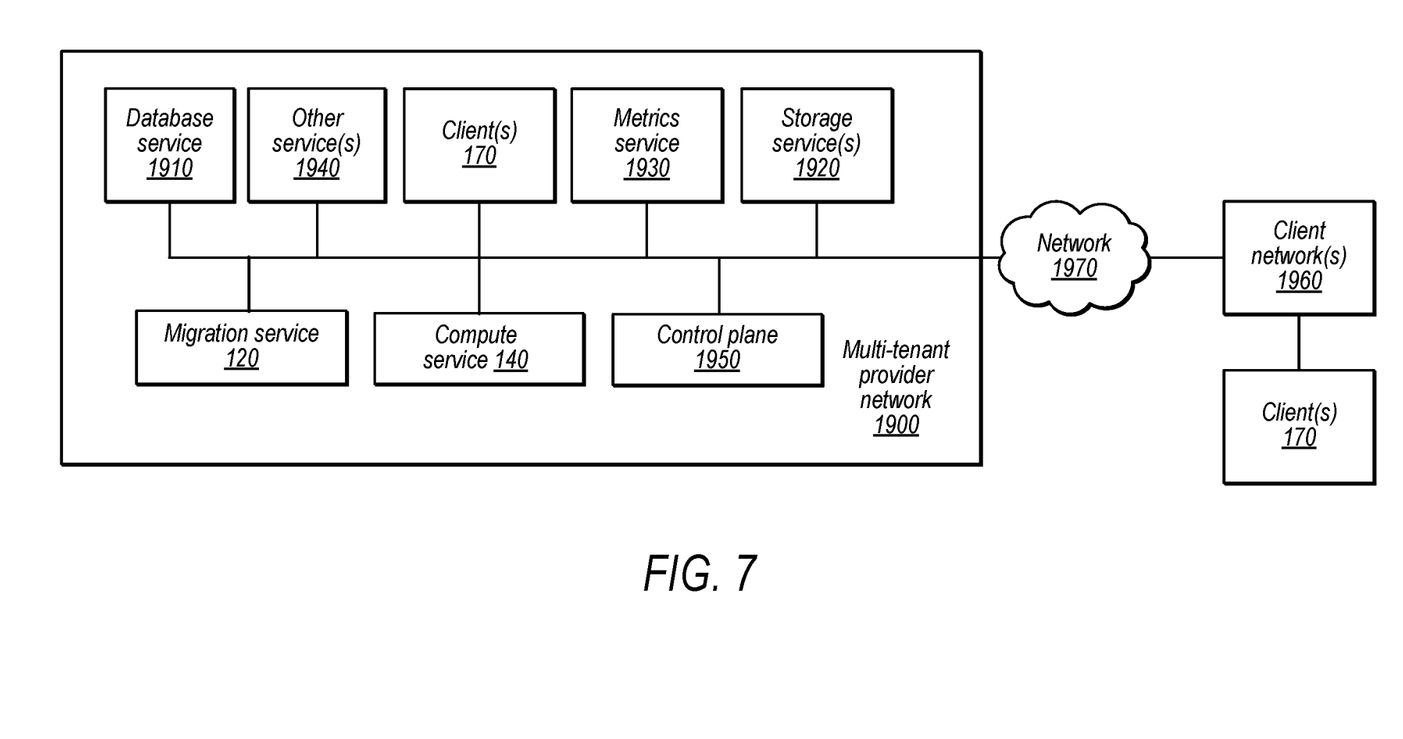
FIG. 7 is a block diagram illustrating a service-provider based architecture for a system that implements a migration service for migrating databases, according to at least some embodiments.

In response to a request to run a task which includes containers of different security levels, in some embodiments respective GVMs may be used for individual containers of the task in the depicted embodiment. For example, the container execution resource managers, working together with control plane or administrative components of VCS and VMCs, such as control plane 1950 as shown in FIG. 7 below, may cause a respective GVM of a selected GVM category to be launched for each container of a task.

In at least some embodiments, the communication capabilities of the GVM used for an enhanced-security container may be restricted—e.g., over-the-network communications with external processes or programs (programs running at a host other than the VH used for the GVM) may be prohibited, direct access to persistent storage may be prohibited, and so on. Some of these restrictions may follow from the limited set of devices emulated for the GVM in various embodiments; other types of configuration settings may be used to enforce the isolation of the GVM in other embodiments. A highly secure channel (e.g., a channel which utilized shared memory regions of the virtualization host) may be set up for communication between the enhanced security container and external processes or entities, such as one or more standard security level containers of the same task in various embodiments.

In at least some embodiments, such a secure channel may be the only mechanism which can be used to transfer data in and out of the enhanced security container. In one embodiment, even the types of communications permitted on such a channel may be restricted—e.g., processes running within the enhanced security container may only be allowed to transmit results of computations performed within the enhanced security container in a particular format, and only receive requests for such results via the channel. Note that other factors, such as the desired computing or memory capacity of the containers, may also play a role in the selection of the GVM categories in various embodiments.

After the GVMs for the containers of a task have been launched or identified, in at least some embodiments the CTMS 210 may launch respective agents in each of the GVMs, and then use the agents to start up the containers of the task. In various embodiments, the machine images used for the enhanced-security containers may comprise pre-selected security artifacts (e.g., cryptographic keys) to be used to perform computations on behalf of the CTMS client at whose request the task is run. In other embodiments, a secure channel of the kind mentioned above may be used to send security artifacts to be used for the computations to the enhanced-security containers, e.g., using a protocol similar to TLS (Transport Layer Security) which prevents intermediaries such as standard security containers from accessing the security artifacts. The secure computations may be performed at the enhanced security containers as needed based on the overall logic of the task, and results may be provided to various destinations via the secure communication channels in at least some embodiments.

The term "container runtime" or "container runtime environment" may be used to refer to a collection of software components that executes containers and manages container images within a given computing environment such as a GVM. Examples of popular container runtimes include containerd, rkt, and lxd. A given container runtime may implement a set of APIs, such as a "run" API to run an instance of a container using a specified image, a "stop" API to stop execution of a container instance, a "gc" command to initiate garbage collection, a "metadata-service" API to help a running application inspect its execution environment and assert its identity, a "list" API to obtain a listing of related pods or groups of containers, and so on. For the kinds of computations to be run at some containers, only a subset of such APIs may be needed (for example, a list API or a metadata service API may not be needed.

Figure 3:
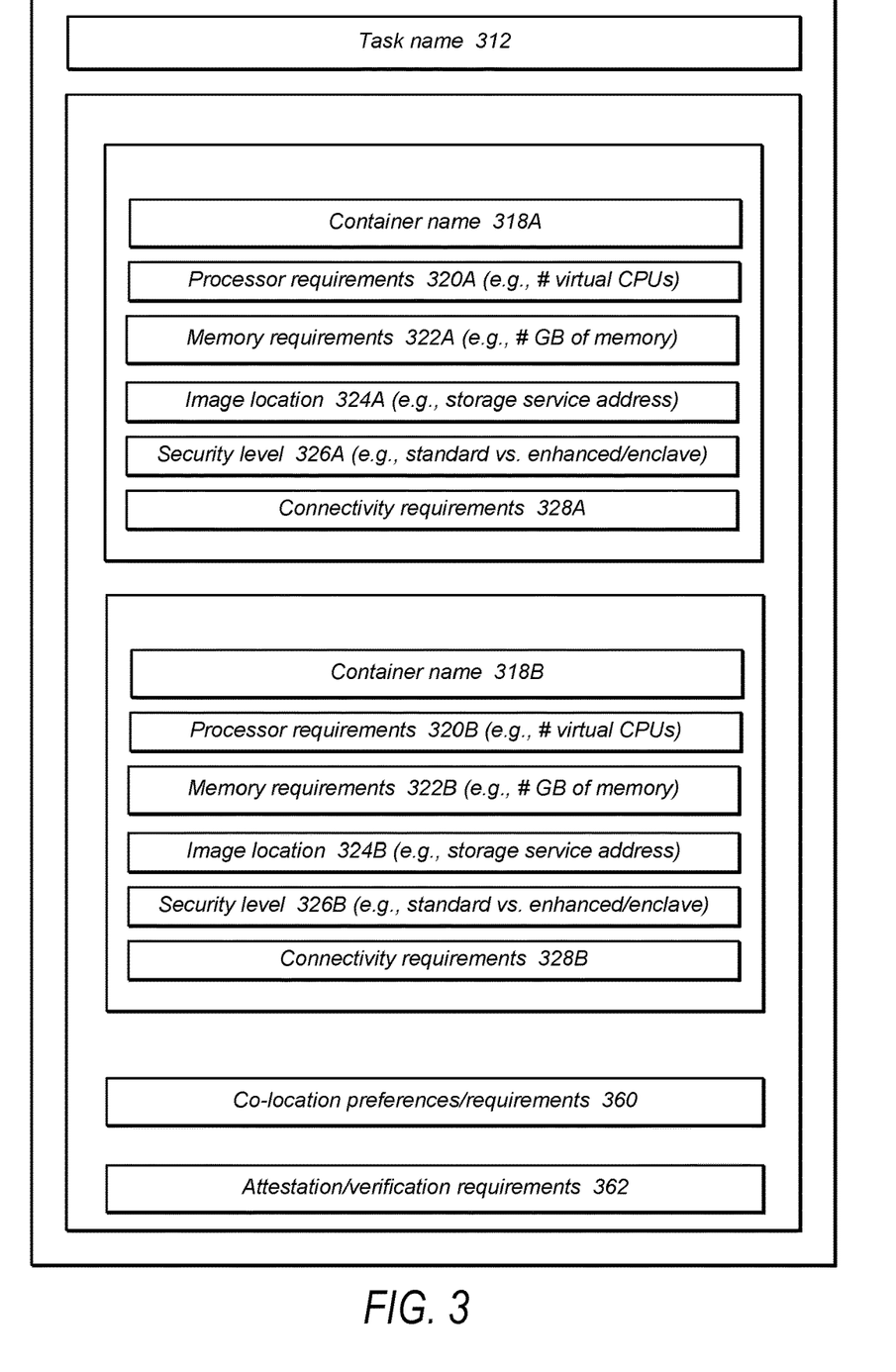
FIG. 3 illustrates an example descriptor of a container-based task, according to at least some embodiments.

FIG. 3 illustrates an example descriptor of a container-based task, according to at least some embodiments. A container-based task may provide part of a migration tool container, as discussed above in FIG. 2, which may enable migrations to be performed using a serverless compute service, improving availability, scalability and ease of use in implementing database migrations, in some embodiments. Such a descriptor may, for example, be submitted to a CTMS similar to CTMS 210 of FIG. 2 by a client via one or more programmatic interfaces. As shown, a task descriptor 310 may include a user friendly task name 312 and a container set 314. The container set 314 may in turn comprise one or more container definitions 316, such as 316A and 316B.

A given container definition 316 may include a container name 318 (e.g., 318A or 318B), processor requirements 320 (e.g., 320A or 320B) such as the number of virtual CPUs to be allocated/assigned to the container, memory requirements 322 (e.g., 322A or 322B), image location 324 (e.g., 324A or 324B) indicating where the executable image for the container can be located, a security level 326 (e.g., 326A or 326B, which may indicate whether standard security or enhanced security is desired for the container) and/or connectivity requirements 328 (e.g., 328A or 328B) in the depicted embodiment. Security levels may also be referred to as isolation levels in some embodiments. The connectivity requirements 328 for a given container may indicate the set of other containers of the task with which the given container is expected to communicate in some embodiments, the types of communication mechanisms/channels to be used, and so on. In at least one embodiment, the default connectivity configuration for a task (e.g., if no connectivity requirements are provided in the task descriptor 310) may allow every container to communicate with every other container of the task. In some embodiments a task descriptor may indicate the particular category of virtual machine to be used for at least some containers—e.g., for an enhanced security level container, the task descriptor may indicate that a "nano" virtual machine (one of several supported categories of virtual machines of a VCS) is to be used.

In one embodiment, a task descriptor 310 may indicate co-location preferences/requirements 360, indicating whether all the containers are to be co-located on the same virtualization host, specific subsets of the containers which are to be co-located on respective virtualization hosts, or whether the choice of mapping containers to virtualization hosts is left up to the CTMS. In other embodiments, co-location parameters or preferences may be provided via programmatic interfaces by a client at a more global level (e.g., by choosing the equivalent of a setting "run all the containers of a given task at the same virtualization host" applicable to all of the client's tasks), and the CTMS may decide how virtual machines used for the client's containers are to be placed on virtualization hosts based on the co-location parameter or preferences.

According to some embodiments, a task descriptor may indicate one or more resource verification requirements 362 (also known as attestation requirements) for the task as a whole or for individual containers. In accordance with such verification/attestation requirements, a resource approval message may have to be obtained from one or more client-specified attestation services or resource verifiers for a virtualization host before the corresponding software containers or their virtual machines are run at the virtualization host. In at least one embodiment, a task descriptor 310 may include other elements than those shown in FIG. 2: for example, such elements may indicate logging requirements for the containers, whether persistent storage is to be made accessible from individual containers (and if so the type of persistent storage needed), whether the task as a whole is to be allowed to continue execution even if some containers finish or fail, load balancing requirements for the different containers, and so on. In some embodiments, a higher-level construct called a client-initiated service may be defined as a group of tasks, and a service descriptor may indicate for example which task descriptor(s) to use, how many instantiations of each tasks are to be run, how the workload should be balanced among the instantiations, and so on.

Figure 4:
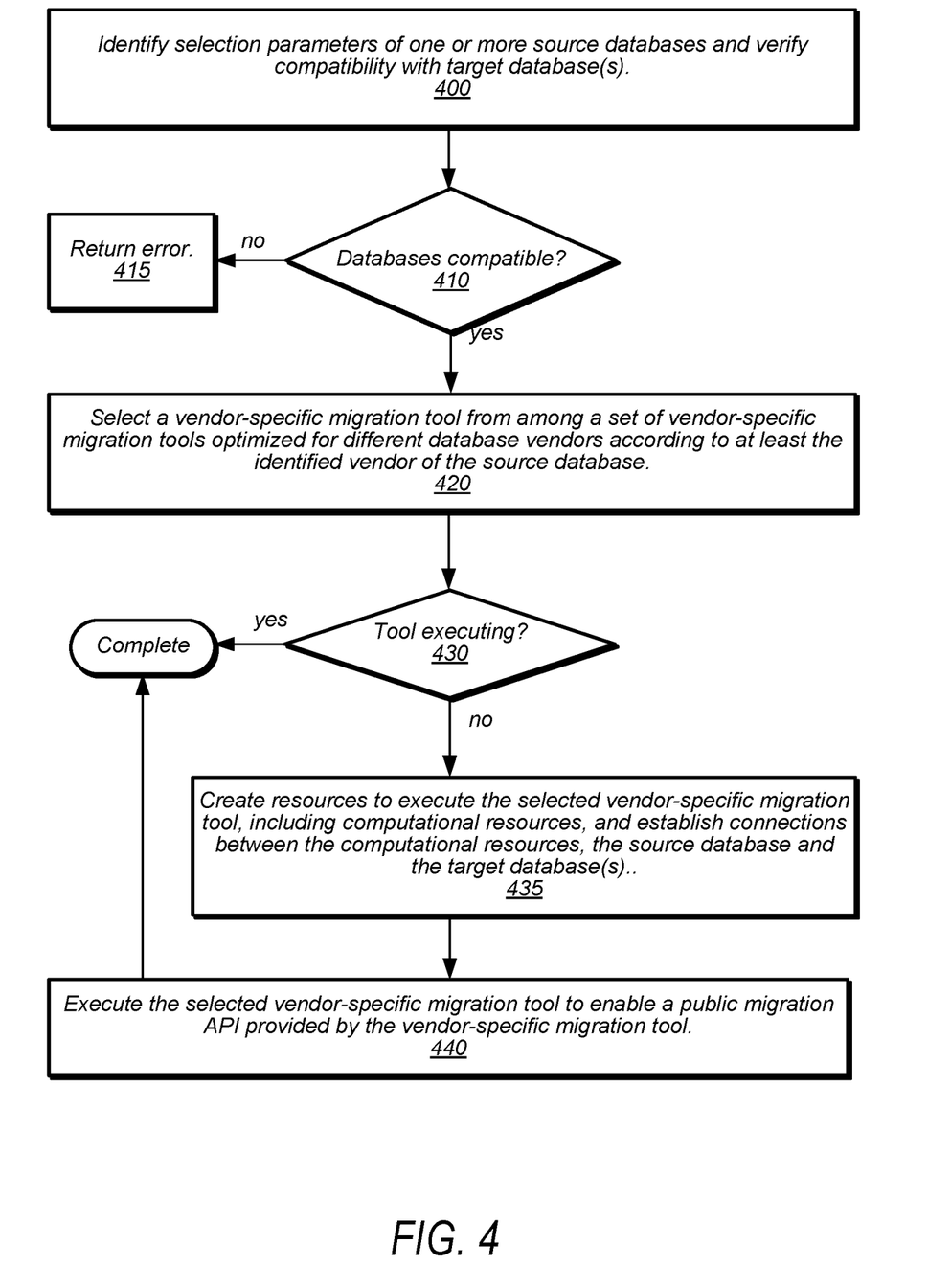
FIG. 4 is a flow diagram illustrating aspects of selecting a vendor-specific migration tool to provide a database migration from a source database to a target database, according to at least some embodiments.

FIG. 4 is a flow diagram illustrating aspects of selecting a vendor-specific migration tool to provide a database migration from source database(s) to target database(s), according to at least some embodiments. By automating the selection of migration tools, a migration service may select a most efficient migration technique based on particular source and target databases, improving performance and ease of use in implementing database migrations, in some embodiments. As shown in 400, a selection criteria, or parameters, of one or more source databases, such as the source database(s) 160 of FIG. 1, may be identified and compared corresponding parameters of target databases, such as the target database 135 of FIG. 1, to verify that the source and target database vendors are compatible, in some embodiments. Examples of such parameters may be database vendor type, database migration type, database schema capability, database engine version and so on. It should be understood, however, that these are mere examples of selection criteria and any number of techniques for identifying migration compatibility may be envisioned, in various embodiments.

Should the source and target databases not be compatible, as indicated by a negative exit from 410, the process may advance to step 415 where a compatibility error may be returned. In some embodiments, a compatibility error may result in a rejection of a corresponding database migration request, while in other embodiments, a compatibility error may result in a database migration being performed without the use of vendor-specific migration tools, such as by performing a migration only with migration functions provided by a vendor-agnostic migration tool or by the library 129 as shown in FIG. 1. These are merely examples, however, and it should be understood that the handling of compatibility errors may be implemented in a variety of ways in various embodiments.

Should the source and target databases be compatible, as indicated by a positive exit from 410, the process may advance to step 420 where a vendor-specific migration tool, such as a vendor-specific migration tool 123 of FIG. 1, may be selected from multiple migration tools optimized for different database vendors, where the migration tool is selected according to the identified selection parameters and the source and target databases, in some embodiments.

As shown in 430, once a migration tool is selected, it may be determined if the tool is currently executing. Should the tool be currently executing, as indicated by a positive exit from 430, the process is then complete. Should the tool not be currently executing, as indicated by a negative exit from 430, the process may advance to step 435 where resources to execute the selected vendor-specific migration tool may be created, including computational resources, and connections established between the computational resources, the source database(s) and the target database(s). Then, as shown in step 440, the tool may be executed to provide a public migration API, such as the migration API 204 of FIG. 2, enabling migrations of source databases to target databases of a database service, in various embodiments. Execution of migration tools may be performed in a number of ways. In some embodiments, migration tools may be executed with a database service or migration service while in other embodiments a compute service, such as the compute service 140 of FIG. 1, may be used to execute migration tools within client virtual environments, such as migration environment 121 as shown in FIG. 1.

A compute service may execute the vendor-specific migration tool using virtual machine instances of a virtual computing service, such as virtual computing 146 of FIG. 1 or use a serverless computing service, such as serverless computing 145 as shown in FIG. 1. To enable execution of vendor-specific migration tools, the tools may be packaged in application containers, such as the container 200 of FIG. 2. Tool containers and execution with a serverless computing service is discussed in more detail above in regard to FIGS. 2 and 3.

Figure 5:
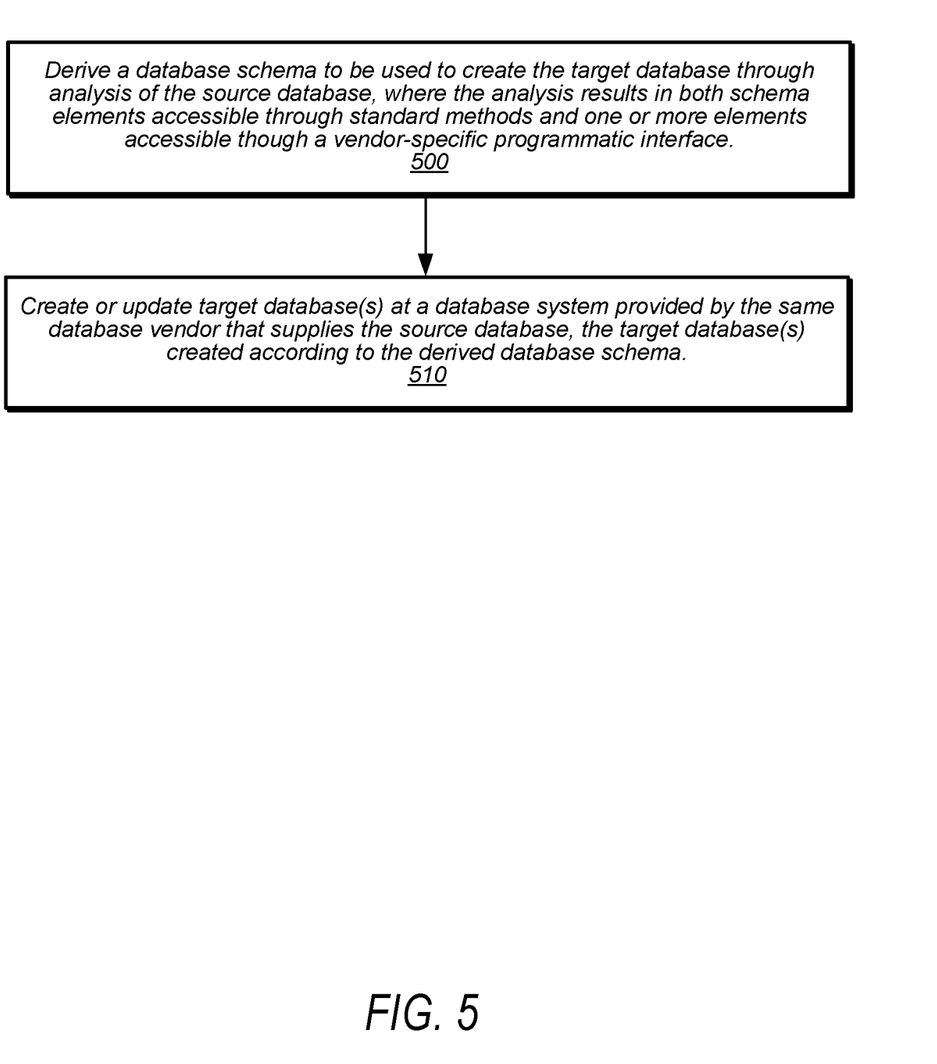
FIG. 5 is a flow diagram illustrating aspects of creating a target database using a a vendor-specific database migration tool, according to at least some embodiments.

FIG. 5 is a flow diagram illustrating aspects of creating target database(s) using a schema automatically derived by a vendor-specific database migration tool, according to at least some embodiments. By automating deriving database schemas and automatically creating or modifying target databases, a migration service may eliminate potential errors during database migrations, in some embodiments. As shown in 500, a database schema may be derived through a vendor-specific analysis of source database schema(s) using a vendor-specific database migration tool, in some embodiments. While a public database schema may be determined for a database using an analysis of a database using publicly available database access mechanisms, the derived schema, in some embodiments, may include both publicly available schema elements accessible using standard, publicly available methods, such as through a relational database query language, and without using vendor-specific tools and additional, private, vendor-specific database attributes, parameters or elements accessible using vendor-specific methods and determined through vendor-specific analysis, in some embodiments. For example, a database schema derived using vendor-specific analysis may include, in addition to a publicly accessible schema for a migrated database, information regarding performance analysis, recommendations, database distribution, support for generation of secondary keys or indexes, etc. These are merely examples and any number of private database attributes may be envisioned as derivable through vendor-specific analysis, in various embodiments.

As shown in 510, one or more target databases in a managed environment of a database service may then be created, updated or replaced using the derived database schema. The target database(s) may be created or updated using a vendor-specific technique via a native API, such as the vendor-agnostic API 208 of FIG. 2, such that the target database(s) incorporate not only the publicly accessible schema elements but one or more private database attributes determined through using vendor-specific analysis, in some embodiments.

Figure 6:
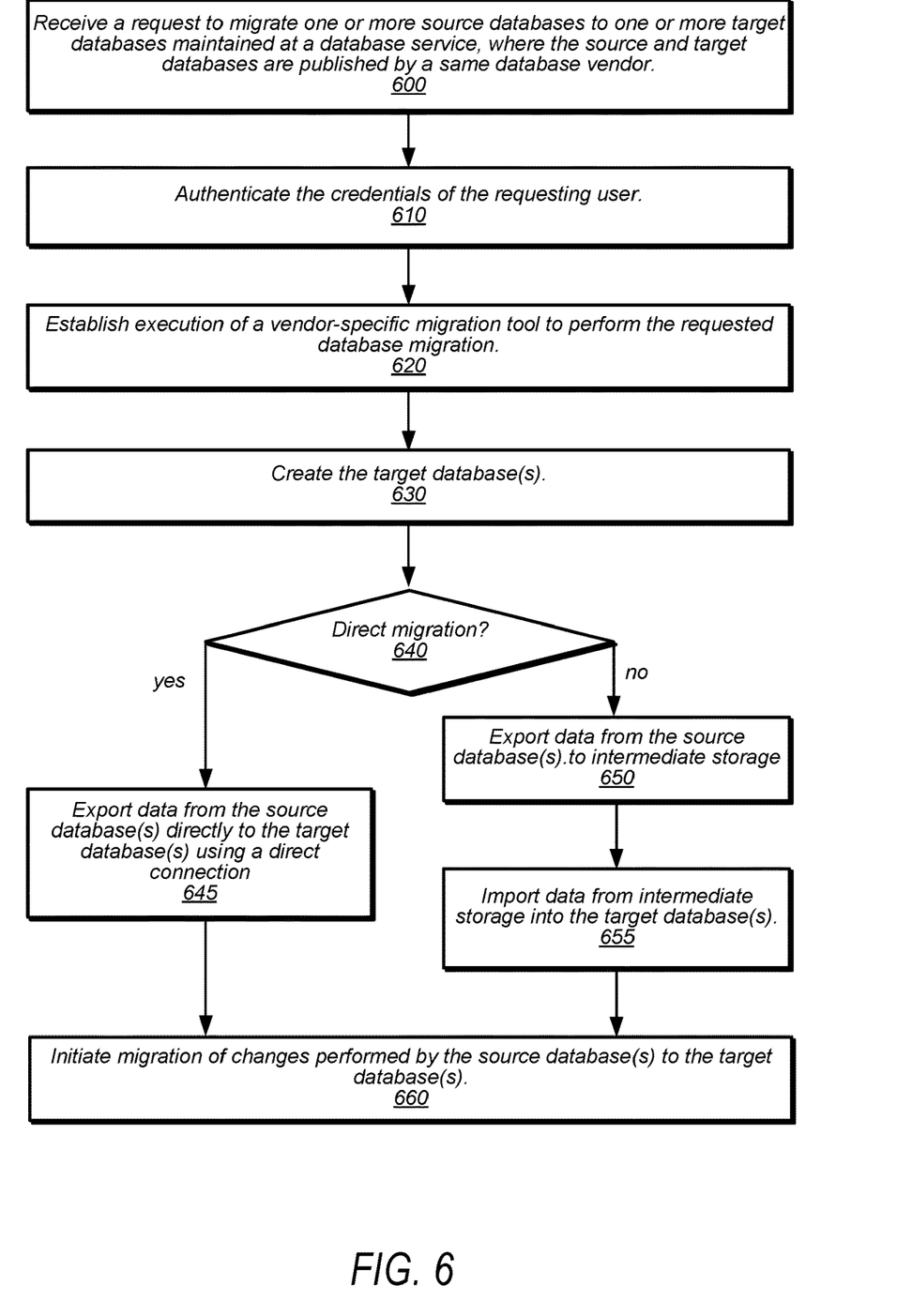
FIG. 6 is a flow diagram illustrating aspects of migrating a source database to a target database using a vendor-specific migration tool, according to at least some embodiments.

FIG. 6 is a flow diagram illustrating aspects of migrating one or more source databases to one or more target databases using a vendor-specific migration tool, according to at least some embodiments. Through the selective use of vendor-specific and vendor-agnostic tools, a migration service may automate and simplify database migrations which may otherwise be time consuming and error prone, in some embodiments. As shown in 600, the process begins when a request to migrate or import source database(s) to target database(s) maintained at a database service may be received. The source and target databases may be published by same or compatible database vendors or possess compatible attributes as discussed above in regard to FIG. 4, enabling an opportunity to perform import, export, schema extraction, replication and other aspects of migration operation using vendor-specific migration techniques, in various embodiments. Such a request may be received through a variety of user interfaces or programmatic interfaces. For example, a request may be submitted by a client via interaction with a graphical user interface in some embodiments, while in other embodiments the request may be submitted through an application programming interface (API) or a command line interface. These examples are not intended to be restrictive and any number of interfaces to receive migration or import requests may be imagined, in various embodiments.

As shown in 610, the credentials of a user requesting the database migration may then be performed. For example, the user, such as client 170 of FIG. 1, may have a user account, such as the database account 110, confirmed before proceeding to perform the requested migration in order to confirm and required container security levels, such as the container security levels 212 as shown in FIG. 2 or the security level 326 of FIG. 3, in some embodiments.

Then, as shown in 620, execution of a vendor-specific migration tool to perform the requested migration may be established, such as described in FIG. 4 above. While not shown, In some embodiments, a database compatibility error may result from an attempt to establish execution of a custom or vendor-specific migration tool. In some embodiments, such an error may result in a rejection of a corresponding database migration request, while in other embodiments, a compatibility error may result in a database migration being performed without the use of vendor-specific migration tools, such as by using generic migration functions of the library 129 as shown in FIG. 1. These are merely examples, however, and it should be understood that the handling of vendor match errors may be implemented in a variety of ways in various embodiments.

As shown in 630, in some embodiments the target database(s) may then be created, if required, at the managed database service such as described in FIG. 5 above. The target database(s) may be created, in some embodiments, using a schema and associated attributes derived from analysis of the source database(s) using vendor-specific tools, such as the vendor-specific migration tool 123 as shown in FIG. 1, in some embodiments. By using vendor-specific analysis and database creation processes, data, attributes such as information regarding performance analysis, recommendations, database distribution, support for generation of secondary keys or indexes, etc. may be preserved during migration of the source database(s) to the target database(s), in some embodiments.

The process may then determine if a direct migration of all or a portion of the source database(s) may be performed. If a direct migration is to be performed, as shown in a positive exit from 640, then the process may advance to step 645 . . . . If a buffered migration is to be performed, as shown in a negative exit from 640, then the process may advance to step 650.

As shown in 645, in some embodiments a migration may be performed using a direct connection between source and target databases, such as using the direct connection 220 as shown in FIG. 2. A direct migration may be beneficial to reduce migration time, network bandwidth and computational resources when using particular vendor-specific migration tools. This is merely an example scenario where direct migration may be used and is not intended to be limiting.

At step 645, all or portions of data from the source database(s) may be exported directly to the one or more target databases through direct communication connections, in some embodiments, the data including publicly accessible data defined according to a standard accessible schema as well as vendor-specific data defined according to attributes identifiable using a vendor-specific migration tool and accessible using a vendor-specific means, such as through a vendor-agnostic API 208 of FIG. 2. Upon completion of direct migration of the source database, the process may advance to step 660.

As shown in 650, in some embodiments a migration may be performed using data buffering at intermediate storage such as provided by a database or storage service, including the database service 130 of FIG. 1. A buffered migration may be performed, for example, when direct connections between source and target databases are unavailable, when direct migration is unavailable using a particular vendor-specific migration tool, or when the amount of data to be migrated is more efficiently migrated using an intermediate storage technique. These are merely example scenarios where buffered migration may be selected and are not intended to be limiting.

At step 650, all or portions of data of the source database(s) may be exported to an intermediate storage location, the data including publicly accessible data defined according to a publicly accessible schema as well as private data defined according to attributes identifiable using a vendor-specific migration tool and accessible using a vendor-specific means, such as through a vendor-agnostic API 208 of FIG. 2. The intermediate storage may be provided by the same database or storage service providing the target databases, in some embodiments, such as the database service 130 of FIG. 1, or other suitable temporary storage location.

As shown in 655, the exported data from the source database(s) may then be imported from the intermediate storage location into the target database, including publicly accessible data defined according to a publicly accessible schema as well as private data defined according to attributes identifiable using a vendor-specific migration tool and accessible using a vendor-specific means, such as through a vendor-agnostic API 208 of FIG. 2. Data exported from the source database(s) may be transferred through a private connection directly to the target database(s) in some embodiments while in other embodiments intermediate storage may be used, as determined by the data transfer protocol implemented by the vendor-specific migration tool, such as is shown by the various communications paths between the source database(s) 160, the target database(s) 135 and the CTMS 210 as shown in FIG. 2, in various embodiments. The process may then advance to step 660.

As shown in 660, in some embodiments the source database(s) may continue to be available to users for update access. To accommodate changes to the source database(s) during migration, migration of these changes, such as due to write and update transactions, to the source database(s) may be initiated, changes migrated to the target database. This change migration may continue until the migration process is complete, the source database(s) made unavailable to users for write or update transactions or for other reasons. These are merely examples and are not intended to be limiting.

FIG. 7 is a block diagram illustrating a service-provider based architecture for a system that implements a migration service for migrating databases, according to at least some embodiments. In the illustrated embodiment, migration service 120 and compute service 140 are services provided by multi-tenant provider network 1900.

Multi-tenant provider network 1900 is illustrated as providing numerous other services 1940 to multiple tenants, or clients, such as, but not limited to, a database service 1910 (providing relational, non-relational database services, or both), storage service(s) 1920 (e.g., key-value store, short-term, long-term, or the like, etc.), metrics service 1930 (e.g., obtaining, aggregating and storing metrics about the various services of the service provider network) and so forth. These services may function as clients 170 of other services of the multi-tenant provider network 1900, in some embodiments. Multiple tenants, or clients, 170 are illustrated as both external (communicably coupled via client networks 1960 and intermediate network 1970 (e.g., the Internet or similar) to the service provider network) and internal (as services discussed above) to the multi-tenant provider network. In some embodiments, one of the services of the service provider network may be a client of another one of the services.

Multi-tenant provider network 1900 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Various aspects of database migration may be performed using either vendor-specific tools or vendor-agnostic tools, and freely mixed in any combination in various embodiments. For example, schema derivation, database creation, data import and export, and change data migration processes may all be implemented in both vendor-specific tools and vendor-agnostic tools and mixed in any manner resulting in improvements in database migrations. In some embodiments, these tools may be intermixed during command processing, such as by implementing usage of a combination of tools in the command processor 202 of FIG. 2, where vendor-agnostic tools may either be provided as part of a migration tool container, such as the vendor-agnostic migration tool 206 of FIG. 2, or as part of a tool library, such as the library 129 as shown in FIG. 1. These are merely examples and are not intended to be limiting.

Furthermore, in some embodiments, in addition to multiple vendor-specific or application-specific migration tools provided as containers for a serverless compute-based migration service selected according to selection parameters as discussed above in FIG. 4, a migration service may also provide a generic or vendor-agnostic migration tool as a container usable when source and target database compatibility cannot be ensured. Thus, a vendor-agnostic database migration may still be performed with the performance benefits of serverless computing infrastructure even in the case of source and target databases of different vendors of with otherwise incompatible selection criteria, in some embodiments. In other embodiments, a vendor-agnostic database migration may be provided as part of a migration library, such as shown in the library 129 of FIG. 1.

Selection of a custom or vendor-specific migration tool, or the selection of a vendor-agnostic migration tool, may then be made according to the selection criteria as disclosed in FIG. 4. In some embodiments, different migration tools may have different selection parameters, thus one migration tool may require only vendor matching compatibility while another may require specific database engine version in addition to database vendor compatibility, in some embodiments. These are merely examples and are not intended to be limiting.

Preferably, availability zones within a region may be positioned far enough away from one other that the same natural disaster should not take more than one availability zone offline at the same time. Users may connect to availability zones of the multi-tenant provider network 1900 via a publicly accessible network (e.g., the Internet, a cellular communication network). Regions are connected to a global network which includes private networking infrastructure (e.g., fiber connections controlled by the cloud provider) connecting each region to at least one other region. The multi-tenant provider network 1900 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the multi-tenant provider network 1900 to provide low-latency resource access to customers on a global scale with a high degree of fault tolerance and stability.

The traffic and operations of the cloud provider network may broadly be subdivided into two categories in various embodiments: control plane operations carried over a logical control plane 1950 and data plane operations carried over a logical data plane. While the data plane represents the movement of user data through the distributed computing system, the control plane 1950 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, multi-tenant provider network 1900 may include the hardware (e.g., modems, routers, switches, load balancers, proxy servers, etc.) and software (e.g., protocol stacks, accounting software, firewall/security software, etc.) necessary to establish a networking links between different components of multi-tenant provider network 1900, such as computation and storage hosts, control plane components as well as external networks, such as network (e.g., the Internet). In some embodiments, multi-tenant provider network 1900 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 170 may be attached to the overlay network so that when a client provides an IP address that they want to send packets to, the IP address is run in virtual space by communicating with a mapping service that knows where the IP overlay addresses are.

Illustrative System

Figure 8:
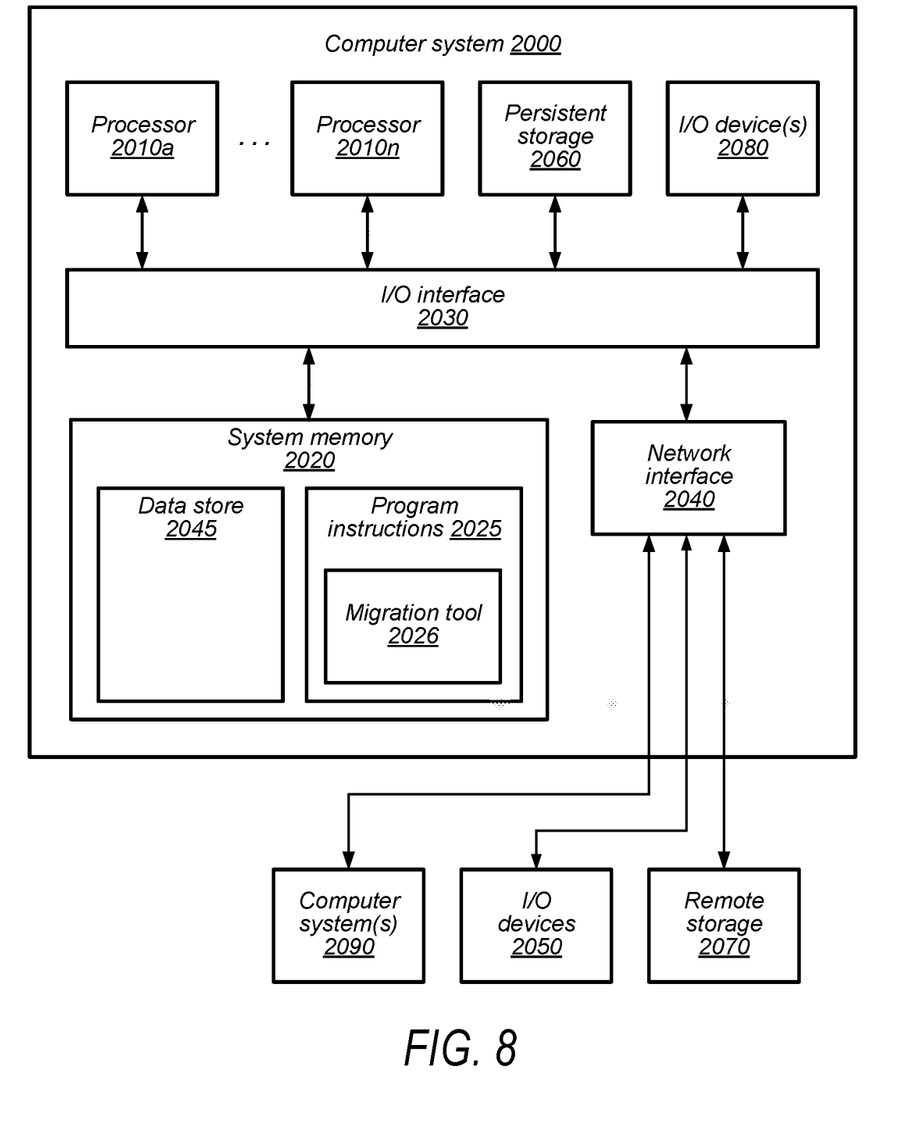
FIG. 8 is a block diagram illustrating an example computer system that may be used in some embodiments of a system that implements a migration service for migrating databases, according to at least some embodiments.

Any of various computer systems may be configured to implement processes associated with a technique for multi-region, multi-primary data store replication as discussed with regard to the various figures above. FIG. 8 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 8 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a migration tool as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of a database migration service and deployment as described herein may be executed on one or more computer systems, which may interact with various other devices. FIG. 8 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a database migration service configured to:
receive, from a client of a database service, a request to migrate a source database to a target database maintained by the database service, and responsive to the request:
select a migration tool from among a plurality of migration tools according to a database vendor of the source database or the target database, wherein the migration tool is configured to perform database migrations using one or more vendor-specific interfaces, wherein the migration tool is one of the plurality of migration tools, and wherein individual ones of the plurality of migration tools are published by respective ones of a plurality of database vendors including the database vendor; and
perform the requested migration, wherein to perform the requested migration the migration tool is configured to:
export at least a portion of data from the source database according to the vendor of the source database;
import the at least a portion of data into the target database according to the vendor of the target database; and
initiate migration of changes to the at least a portion of data from the source database, according to the vendor of the source database, to the target database, according to the vendor of the target database.

2. The system of claim 1, wherein to perform the requested migration the migration tool is further configured to:
create, by the migration tool, the target database according to a schema derived from the source database by the migration tool; and
execute one or more functions of a native migration application programming interface (API) private to the migration tool, wherein the native migration API is published by the database vendor.

3. The system of claim 2, wherein the derived schema comprises a plurality of publicly accessible schema elements and one or more private elements accessible via a native migration application programming interface (API) private to the migration tool.

4. A method, comprising:
receiving, from a client of a database service, a request to migrate a source database to a target database maintained by the database service, the source database and target database published by a database vendor, and responsive to the request:
selecting a migration tool from among a plurality of migration tools according to a database vendor of the source database or the target database, the migration tool performing database migrations using one or more vendor-specific interfaces; and
performing the requested migration by the migration tool, comprising:
exporting at least a portion of data from the source database; and
importing the at least a portion data into the target database;
wherein at least one of the exporting and importing are performed in part using one or more functions of the migration tool identified according to the database vendor of the source database or the target database.

5. The method of claim 4, further comprising:
initiating, by the migration tool, migration of changes to the at least a portion of data from the source database to the target database.

6. The method of claim 4, wherein performing the requested migration further comprises executing one or more functions of a native migration application programming interface (API) private to the migration tool.

7. The method of claim 6, wherein performing the requested migration further comprises executing one or more vendor-agnostic migration functions using public interfaces of the source database or target database.

8. The method of claim 6, wherein the migration tool is one of the plurality of migration tools, wherein individual ones of the plurality of migration tools are published by respective ones of a plurality of database vendors, and wherein the migration tool comprises the native migration API.

9. The method of claim 4, wherein selecting the migration tool comprises selecting a migration container comprising the migration tool, and wherein performing the requested migration comprises executing the selected migration tool of the migration container using a dynamically-scaled serverless computing service.

10. The method of claim 4, further comprising:
creating, by the migration tool, the target database according to a schema derived from the source database by the migration tool.

11. The method of claim 10, wherein the derived schema comprises a plurality of publicly accessible attributes and one or more private attributes accessible via a native migration application programming interface (API) private to the migration tool.

12. The method of claim 4, wherein the migration is performed by a migration service of a multi-tenant service provider network that further comprises the database service and a compute service, wherein the target database is a managed database provided by the database service, and wherein the migration is implemented using the compute service of the multi-tenant service provider network.

13. One or more non-transitory computer-accessible storage media storing program instructions that when executed on or across one or more computing devices cause the one or more computing devices to perform:

receiving, from a client of a database service, a request to import a client-managed source database to a target database managed by the database service, and responsive to the request:
    selecting a database import tool from among a plurality of database import tools according to a database vendor of the source database or the target database, the database import tool performing database migrations using one or more vendor-specific interfaces; and
    performing by the database import tool:
        exporting at least a portion of data from the client-managed source database; and
        importing the exported at least a portion of data into the target database;
        wherein at least one of the exporting and importing are performed in part using one or more import operations of the database import tool identified according to the database vendor of the source database or the target database.

14. The one or more non-transitory computer-accessible storage media of claim 13, the program instructions that when executed on or across one or more computing devices cause the one or more computing devices to further perform:
    initiating, by the database import tool, replication of transactions from the client-managed source database to the target database using one or more other import operations identified according to the database vendor of the source database or the target database.

15. The one or more non-transitory computer-accessible storage media of claim 13, wherein performing the requested import comprises executing one or more functions of a native application programming interface (API) private to the database import tool.

16. The one or more non-transitory computer-accessible storage media of claim 15, wherein the database import tool is one of the plurality of database import tools, wherein individual ones of the plurality of database import tools are published by respective ones of a plurality of database vendors, and wherein the database import tool comprises the native API.

17. The one or more non-transitory computer-accessible storage media of claim 13, wherein selecting the database import tool comprises selecting a container comprising the database import tool, and wherein performing the requested import comprises executing the selected database import tool of the container using a dynamically-scaled serverless computing service.

18. The one or more non-transitory computer-accessible storage media of claim 13, the program instructions that when executed on or across one or more computing devices cause the one or more computing devices to further perform:
    creating, by the database import tool, the target database according to a schema derived from the client-managed source database by the database import tool, wherein the derived schema comprises a plurality of publicly accessible elements and one or more private schema elements accessible via a native application programming interface (API) private to the database import tool.

* * * * *